United States Patent [19]

Graebner

[11] Patent Number: 5,112,126
[45] Date of Patent: May 12, 1992

[54] APPARATUSES AND METHODS FOR MAKING GEOPHYSICAL MEASUREMENTS USEFUL IN DETERMINING THE DEFLECTION OF THE VERTICAL

[75] Inventor: Peter Graebner, Santa Ana, Calif.

[73] Assignee: Chevron Research & Technology Company, San Francisco, Calif.

[21] Appl. No.: 558,931

[22] Filed: Jul. 27, 1990

[51] Int. Cl.⁵ .................. G01B 11/26; G01C 1/00; E21B 47/022

[52] U.S. Cl. .................................. 356/152; 33/283; 33/304; 33/306; 33/309; 356/148; 356/149; 356/250

[58] Field of Search .............. 340/854; 356/141, 152, 356/148, 149, 250; 33/282, 283, 302, 304, 306, 308, 309, 314; 73/151; 250/261, 265

[56] References Cited

U.S. PATENT DOCUMENTS

| 4,136,955 | 1/1979 | Aeschlimann et al. | 356/152 |
|---|---|---|---|
| 4,291,978 | 9/1981 | Seigel | 356/152 |
| 4,433,491 | 2/1984 | Ott et al. | 33/302 |
| 4,434,654 | 3/1984 | Hulsing. II et al. | 73/151 |
| 4,507,958 | 4/1985 | Russell et al. | 73/151 |
| 4,542,647 | 9/1985 | Molnar | 33/304 X |
| 4,570,353 | 2/1986 | Evans et al. | 33/308 X |
| 4,664,519 | 5/1987 | Hullein et al. | 356/152 |
| 4,722,603 | 2/1988 | Graebner et al. | 356/358 X |
| 4,779,201 | 10/1988 | Iizuka et al. | 73/151 X |
| 4,956,921 | 9/1990 | Coles | 33/302 X |

Primary Examiner—Stephen C. Buczinski
Attorney, Agent, or Firm—E. A. Schaal; E. J. Keeling

[57] ABSTRACT

A non-magnetic apparatus is disclosed for finding the deflection of the vertical. That apparatus has a device for finding an instrument spatial angle between a reference direction and an instrument characterization direction, and a device for finding a deflection spatial angle between the instrument characterization direction and a direction along a plumb line. Preferably, the device for finding the instrument spatial angle uses a system of gyroscopes. Preferably, the device for finding the deflection spatial angle uses a pendulum.

10 Claims, 5 Drawing Sheets

APPARATUSES AND METHODS FOR MAKING GEOPHYSICAL MEASUREMENTS USEFUL IN DETERMINING THE DEFLECTION OF THE VERTICAL

The present invention relates to various apparatuses and methods for making geophysical measurements useful in finding the deflection of the vertical. When used in a borehole, knowledge of the deflection of the vertical aids in finding the lateral direction to an anomalous distribution of mass. When combined with surface or borehole gravity measurements, it helps estimating the nature of the subsurface geology.

BACKGROUND OF THE INVENTION

In producing oil and gas, it is often desirable to make "gravity" surveys, i.e., surveys of gravitational field measurements at various locations. Gravity information has many uses. For example, it can be used to predict the location of faults, salt domes, and other subsurface features. It can be used to locate hydrocarbon bearing strata and to locate fronts of steam or water floods.

Gravity measurements are now possible to a high degree of precision. U.S. Pat. No. 4,422,329 discloses a high precision gravity meter, currently manufactured by Delta-G Instruments, that can be used in boreholes. U.S. Pat. No. 4,722,603 discloses a high precision method of finding the vertical location of a gravity meter. U.S. Pat. Nos. 4,422,329 and 4,722,603 are both fully incorporated herein for all purposes.

The theory of the deflection of the vertical is an old part of the science of geodesy. The deflection of the vertical is the spatial angle between the direction of a plumb line (sometimes called the gravitational vertical) and the perpendicular (the normal) to the reference spheroid. This difference seldom exceeds thirty seconds of arc.

W. Torge, *Methods of Measurement in Geodesy*, GEODESY, Walter de Gruyter, Berlin, 1980, 254 pages, summarizes the available methods of finding deflection of the vertical. For example, it describes observations of the position of stars, use of a "photographic zenith tube," the "prism astrolabe," and "portable zenith cameras." BUMFORD, PHYSICAL GEODESY (1980) also discusses this topic.

Spatial angles, such as the deflection of the vertical, can be fully defined by two angles (e.g., $\theta$ and $\phi$, shown in FIG. 2). FIG. 2 shows a first direction 1 (such as an astronomically derived reference direction) and a second direction 2 (such as an instrument characterization direction). The spatial angles between these two directions can be expressed either within the context of a Cartesian coordinate system or a spherical coordinate system.

The deflection of the vertical is currently estimated using gravity measurements, topography, and the shape of the sea surface. Elaborate astronomical measurements can establish an estimated value using special surveying techniques. Before the present invention, there was no way of making direct measurements of deflection of the vertical using a portable device on land, or within mine shafts and tunnels, or in the borehole.

DISCUSSION OF COMMON GEODETIC TERMS

Equipotential Surface

An equipotential surface is a surface upon which the potential of gravitation is constant. There are an infinite number of these surfaces within and outside the earth. Like the layers of an onion, they are closed and do not intersect each other. They are often called level surfaces because they can be defined with a carpenter's level or plumb bob.

Geoid

A geoid is a conceptual equipotential surface that is "closed" and contains most of the earth. It is one of an infinite number of equipotential surfaces associated with the earth. The geoid is everywhere horizontal. A carpenter's level is everywhere parallel to the geoid and a plumb-bob is everywhere perpendicular. The geoid is a reference surface for much of man's work on earth because of our dependence on the "vertical" for locating buildings, roads, lots, political boundaries, etc.

Plumb-Line

A plumb-line is a line of force of the earth's gravitational field; i.e., it is a curved line that at every point specifies the direction of gravity. Such a line intersects all equipotential surfaces normally.

DISCUSSION OF DEFLECTION OF THE VERTICAL

The deflection of the vertical provides an absolute direction of the gravity vector. The deflection of the vertical can be as important as the magnitude of gravity.

There are several equivalent definitions. Consider a point on the geoid that lies along a vertical line defined by the intersection of vertical planes in the north-south and east-west directions. The deflection of the vertical in the north-south direction is simply the slop of the geoid measured in the north-south plane. Specification of this slope in both orthogonal directions amounts to a complete mathematical description. Another way of stating this is to consider the deflection of the vertical to be associated with the maximum slope of the geoid with respect to the reference ellipsoid. Another mathematical definition of the deflection of the vertical is the plane angle equal to the ratio of the horizontal to the vertical components of gravity.

The formal definitions of the deflections of the vertical used in Geodesy vary slightly. They vary according to the point of observation (at topographic surface or on the geoid) and the required directions used for comparison (plumb-line or ellipsoidal normal).

ALTERNATE METHODS TO FIND THE DEFLECTION OF THE VERTICAL

There are two fundamental approaches to finding the deflection of the vertical at a point on surface of the earth.

The first approach uses a large set of gravity measurements at known locations on the surface. This approach employs the integral theorem of Stokes. Significant modifications have been made to this famous theorem by the work of M. S. Molodenskij (See G. BOMFORD, GEODESY, Clarendon Press, Oxford, England, 1980, 855 pages).

The second approach is to compare the astronomic and geodetic coordinates of the location. A review of this approach is provided in W. HEISKANEN and H. MORITZ, PHYSICAL GEODESY, W. H. Freeman and Company, San Francisco, 1985, 364 pages; W. TORGE, GEODESY; P. VANICEK and E. KRAKIWSKY, GEODESY: THE CONCEPTS, Elsevier, Amsterdam, North-Holland, 1986, 697 pages; and BOMFORD (1980, p. 254–355).

An example of an actual determination of the deflection of the vertical is found in O. Mathisen, Determination of deflection of vertical with a small instrument, 93 BULLETIN GEODESIQUE 283–286 (1969). Simple instruments are used: a wild theodolite (an optical surveying instrument with striding level and zenith ocular micrometers) and a time reference (chronometer and receiver for radio time signals). Astronomical latitude is determined by observing zenith distances for stars passing the meridian. Polaris observations are used to determine astronomical azimuth. Polar motion is accounted for in Mathisen's estimates of both final results: deflection in astronomical latitude (north-south DOV) and deflection in prime vertical (east-west DOV). The location must be associated with known geodetic coordinates and a known azimuth. The uncertainties in the components of the deflection of the vertical are about one second of arc.

SUMMARY OF THE INVENTION

The present invention is a non-magnetic apparatus that can find two spatial angles. The first spatial angle (the instrument spatial angle) is the angle between a reference direction and an instrument characterization direction. The second spatial angle (the deflection spatial angle) is the angle between the instrument characterization direction and a direction along a plumb line. With a knowledge of these two angles, and with a knowledge of the spatial angle between the reference direction and the perpendicular to the reference spheroid, one can readily calculate the deflection of the vertical.

The means for finding the instrument spatial angle can have at least one gyroscope. Preferably, it has more than one gyroscope.

The means for finding the deflection spatial angle can have a pendulum. For instance, in one embodiment, that means has a unidirectional light source attached to the pendulum and it has a system of light sensors positioned to detect the direction of the light from that light source. In a refinement of this embodiment, (1) the system of light sensors has, within its center, a target light sensor, and (2) the means for finding the deflection spatial angle has both a means to move the system of light sensors so as to maintain a constant orientation with respect to the pendulum and a means for monitoring the orientation of the system of light sensors. The target light sensor can be located in a recessed tube. The means to move the system light sensors can have a microprocessor that can identify which light sensor receives the maximum amount of light, calculate a direction to the target light sensor from the light sensor receiving the maximum amount of light, and move the system of light sensors in the direction in search of the condition where the light received by the target light sensor is maximized.

In another embodiment, the means for finding the deflection spatial angle has a system of light sensors and unidirectional light sources contained within a single plane, a reflective means attached to the pendulum that reflects light non-perpendicularily, a means to move the system of light sensors and light sources to maintain a constant orientation with respect to the pendulum, and a means for monitoring the orientation of the system of light sensor and light sources. In this embodiment, the means to move the system of light sources and light sensors can have a microprocessor that can identify which light sensors do not receive light, calculate a pattern that best fits light sensors not receiving lights, and move the system of light sources and light sensors in search of the condition where none of the light sensors receive lights.

In still another embodiment, the means for finding the deflection spatial angle has a laser light source attached to the pendulum; a means for creating a Fresnel diffraction pattern on a surface; a means of finding the diffraction pattern on the surface; a means to move the surface, based upon the diffraction pattern, to maintain a constant orientation with respect to the pendulum; and a means for monitoring the orientation the surface.

Light sources that should be unidirectional can be made unidirectional by placing them recessed in a tube. Preferably, the light source should be monochromatic. The light sensors can be light-sensitive diodes. The system of light sensors can be located on the inner portion of a shell that, at least partly, is spherical or cylindrical.

In still another embodiment of the present invention the means for finding the deflection spatial angle has an opaque fluid, a light source, and a system of light sensors. The system of light sensors can be a system of light-sensitive diodes. The system of light sensors can be located on the inner portion of a member that is at least partly spherical or at least partly cylindrical.

The apparatus, in all embodiments, can have a second means for finding the deflection spatial angle, where the direction determined by the first means for finding that spatial angle is used as a first approximation of the deflection spatial angle in the second means.

The deflection of the vertical can be determined by finding a reference spatial angle between the perpendicular to the reference spheroid and a reference direction; finding an instrument spatial angle between the reference direction and an instrument characterization direction; finding a deflection spatial angle between the instrument characterization direction and a direction along a plumb line; and adding together the reference spatial angle, the instrument spatial angle, and the deflection spatial angle.

BRIEF DESCRIPTION OF THE DRAWINGS

In order to facilitate the understanding of this invention, reference will now be made to the appended drawings of the preferred embodiments of the present invention. The drawings are exemplary only, and should not be construed as limiting the invention.

DETAILED DESCRIPTION OF THE PREFERRED EMBODIMENTS

In its broadest aspect, the present invention is an apparatus for finding the deflection of the vertical. That apparatus has (1) a means for finding an instrument spatial angle between a reference direction and an instrument characterization direction, and (2) a means for finding a deflection spatial angle between the instrument characterization direction and a direction along a plumb line. With a knowledge of these two spatial angles, and with a knowledge of the spatial angle between the perpendicular to the reference spheroid and the reference direction, one can readily calculate the deflection of the vertical.

Figure 1:
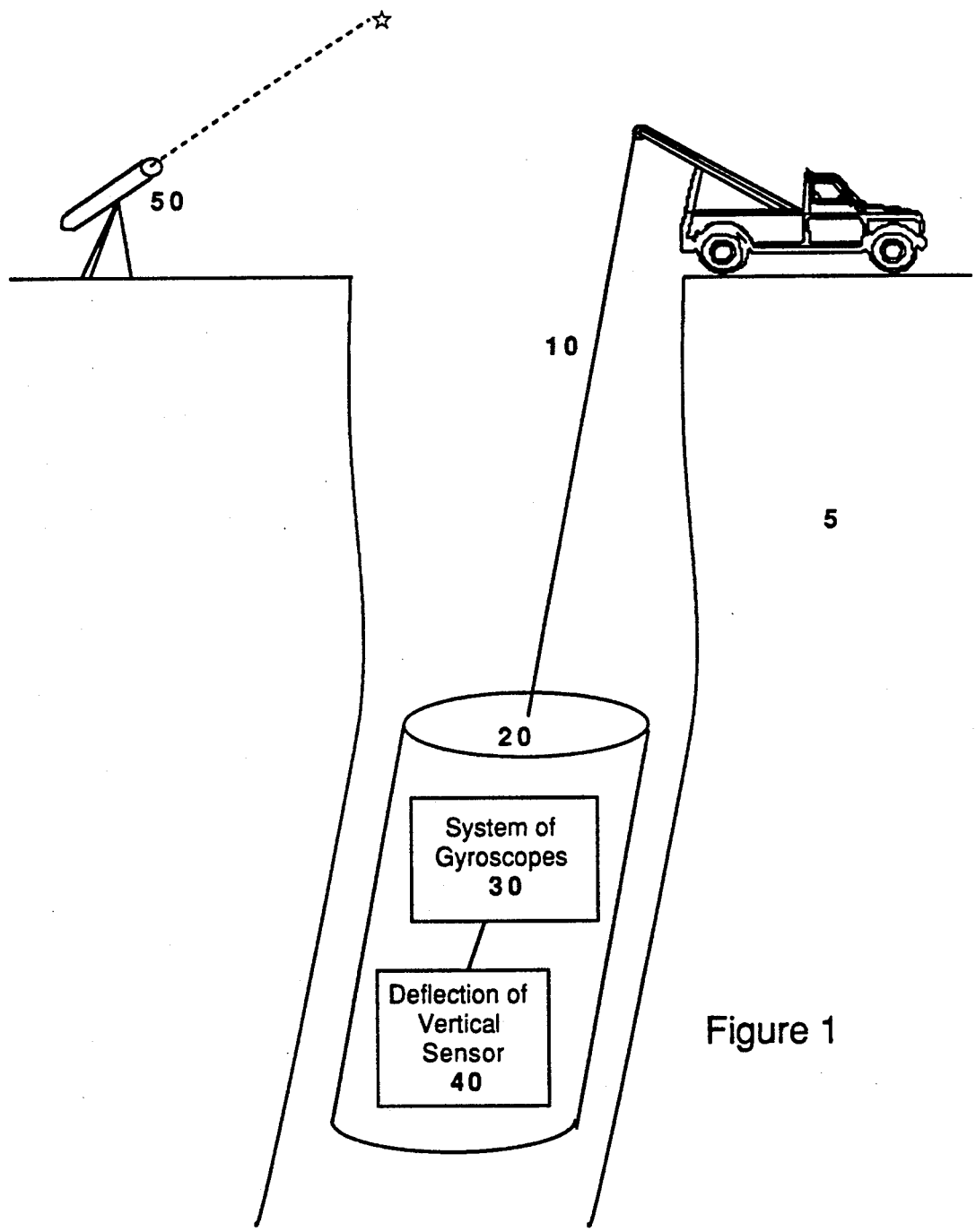
FIG. 1 is a schematic drawing of how one embodiment could be used within a borehole.
Figure 2:
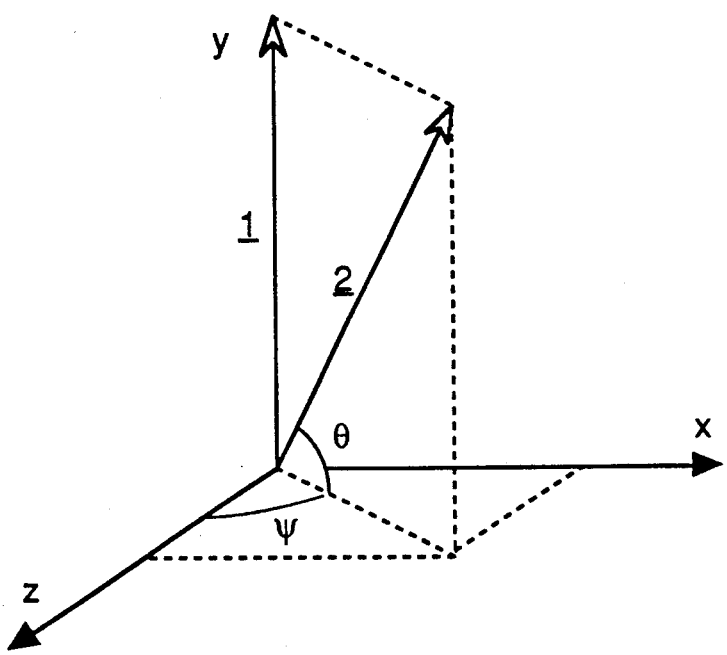
FIG. 2 is a diagram of how spatial differences can be defined.

FIG. 1 shows one embodiment of the use of the present invention. Within formation 5, wireline 10 is used to lower logging sonde 20 into a borehole. Within logging sonde 20 is a system of gyroscopes 30 for finding an instrument spatial angle between a reference direction (which can be determined astronomically by telescopic means 50) and an instrument characterization direction (the orientation of the sonde). Also within logging sonde 20 is a deflection of the vertical sensor 40 for finding a deflection spatial angle between the instrument characterization direction and a direction along a plumb line.

The present invention can be used in a method of finding the location of subsurface features. In that method, one lowers a well logging tool into a subterranean formation, maintains a fixed reference vector as that tool is being lowed, determines a local acceleration due to gravity using the well logging tool, determines a deflection of the pendulum from the fix reference vector using a pendulum means in the well logging tool, and finds the location of the subsurface gravitational anomaly based on the local acceleration due to gravity and the deflection of the pendulum from a fixed reference vector.

In this embodiment, one organizes a body of astronomical, gyroscopic, and geodetic information to provide a means to transform simple, relative, borehole measurements into an estimate of the deflection of the vertical. This is done by finding the spatial angles between a set of directions.

1. A line near the surface of the earth is assigned a spatial direction by using astronomical measurements. That direction is independent of the anomalous gravity field of the earth.

2. The spatial direction maintained by a cluster of the orthogonally-oriented gyroscopes (the reference direction) is referenced to the astronomically determined direction.

3. A straight line marked on the container is referenced to the spatial direction maintained by the gyroscopes (this is the instrument characterization direction). This is established while the container is at rest. The changes in the angles that establish the difference between the gyroscopically determined direction and the direction of the mark on the container (the instrument spatial angle) are recorded continuously from the instant when the comparison is made until the particular survey is completed. The "container" could be a logging sonde, a case used for surface measurements, or a special case for use in mine shafts.

4. A sensor provides a measure of the difference between the direction of the mark on the container and the vertical direction (direction along a plumb line).

These four steps provide a measured direction in the borehole with respect to an absolute direction in space that is independent of local mass. It is not absolutely necessary that the reference direction be established near when the geophysical survey is made. The gyroscopes can be used to "carry" the reference direction from a calibration site to the survey site (perhaps using an aircraft if necessary).

The astronomic determination of an accurate absolute reference azimuth is a time-consuming and tedious task. Preferably, a local standard azimuth is established. Many astronomic measurements could be made at a carefully selected location and a standard spatial direction could be established. Deflection of the vertical measurements made over the years in this location would all be referenced to this standard.

MEANS FOR DETERMINING THE REFERENCE SPATIAL ANGLE

The reference spatial angle is the spatial angle between the perpendicular to the reference spheroid and a reference direction.

By "the perpendicular to the reference spheroid," we mean a straight line that pierces the reference spheroid at a particular point. This straight line is oriented in space such that it is perpendicular to a particular plane that is tangent to the reference spheroid at the particular point.

By "reference direction," we mean an arbitrary known direction that remains constant during the period of observation. In one embodiment, the reference direction can be the perpendicular to the reference spheroid. In other embodiments, it has a constant spatial angle from the perpendicular to the reference spheroid. The reference direction serves as a reference line for the determination of the instrument spatial angle and can serve as an intermediary in the determination of how the instrument orientation changes with respect to the perpendicular to the reference speroid. By noting how the instrument spatial angle changes with time one can keep track of how the orientation of the instrument changes with time.

Consider a set of three orthogonal gyroscopes close to each other (each fixed in position with respect to the others) where each employs the Sagnac principle. Each gyroscope produces an electrical signal that denotes an increment of rotation about the axis of the gyroscope. Any rotation experienced by the set of three gyroscopes can be uniquely characterized using a microprocessor to receive the electrical signals and determine the net rotation.

MEANS FOR DETERMINING THE INSTRUMENT SPATIAL ANGLE

The instrument spatial angle is the spatial angle between a reference direction and the instrument characterization direction.

By "instrument characterization direction," we mean a direction that characterizes the orientation of an instrument. For instance, the marking with an arrow "This Side Up" on a side of box shows a characterization direction since it characterizes the orientation of that box. When we see a box with a "This Side Up" arrow pointing down we know that the box is upside down. Without that arrow, or other knowledge of the characterization direction for that instrument, we wouldn't know whether or not the box was upside down. If desired, an instrument characterization direction can be shown on an instrument by a straight marking on its casing.

One embodiment of the means for finding the instrument spatial angle has at least one gyroscope. By "gyroscope" we mean an instrument that maintains a constant reference direction. The invention uses this capability for maintaining a reference direction to find the spatial angle between a reference direction and the instrument characterization direction.

One class of common gyroscopes makes use of the behavior of a rapidly spinning heavy mass as is predicted from a special form of Newton's Second Law:

Mass is a property possessed by all material bodies. It describes the effort necessary to change the motion of a body. A rapidly spinning heavy mass resists being disturbed and tends to react to a disturbing torque by slowly rotating in a direction orthogonal to the direction of torque.

The usual form of a gyroscope of this class is a flywheel with a heavy rim mounted so that the axis of rotation is free to turn in any direction about a fixed point on the axis of rotation. When this flywheel is spinning rapidly, it resists efforts to change the direction of its axis of rotation. This is equivalent to saying that the flywheel persists in maintaining its plane of rotation.

Another class of gyroscopes involves the measurement of rotation-induced path length differences associated with transmitted light.

The "Sagnac effect" is the name of a phenomena that is used to measure rotation. The "Sagnac effect" is inherent in the design of optical gyroscopes, ring-laser gyros, and fiber-optic gyros. The phenomena was first described in a 1913 publication written by the French scientist Georges Marc Marie Sagnac. [See E. Post, *The Sagnac Effect*, 39 REVIEWS OF MODER PHYSICS 475-493 (1967).]

Briefly, the Sagnac effect is the shift in the relative phase of two light beams that is proportional to the rate of rotation of the entire measurement system. The two light beams are propagating around a circular path in opposite directions (contra-rotating) and are subjected to a rotation in the plane(s) containing the light paths. The light beam traveling in the direction of rotation takes longer to traverse a closed path that the beam traveling against the direction of rotation.

Types of gyroscopes that would work in the present invention include, but are not limited to, the following:

Northrop Precision Products Division Micro-Optic Gyro (MOG) as described in D. Hughes, *Northrop Develops Miniature Las Gyros for Tactical Missiles*, AVIATION WEEK AND SPACE TECHNOLOGY, (Feb. 8, 1988), pages 77-78;

Litton Industries three-axis Inertial Measurement Unit (IMU);

Smith Industries three axis, strapped down IMU; and

Litton, Smith Industries, Honeywell, Draper Laboratory, and Rockwell International miniature fiber-optic gyroscopes, as discussed in: P. Klass, *Firms Research Fiber-Optic Gyros As successor to Ring-Laser Systems*, AVIATION WEEK AND SPACE TECHNOLOGY, (Feb. 13, 1989), pages 79-85.

Preferably, this means can have more than one gyroscope, such as three-component component versions of any of the above. The best configuration uses three gyroscopes that are in a cluster and are mutually orthogonal.

One problem in maintaining the absolute reference direction is that many gyroscope systems are associated with drift. Drift is a gradual systematic change in an instrument reading that is independent of the phenomena being "sensed" and is often related to minor imperfections of the instrument or weaknesses in the theoretical basis for the particular measurement. The approach for reducing the influence of instrument drift is to characterize accurately the drift and then appropriately correct the measured values of the deflection of the vertical.

MEANS FOR DETERMINING THE DEFLECTION SPATIAL ANGLE

The deflection spatial angle is the spatial angle between the instrument characterization direction and the direction along a plumb line. This angle shows how the instrument is oriented in respect to the plumb line.

By "direction along a plumb line," we mean the direction of the tangent to the curved plumb line at a particular point on the plumb line, that direction passing closest to the center of the earth.

There are a variety of ways of finding the deflection spatial angle. These include means that use a pendulum and means that use the level surface of a fluid. Moreover, there are many ways to use a pendulum to find the deflection spatial angle.

EMBODIMENTS INVOLVING THE USE OF A PENDULUM

By "pendulum," we mean a body suspended from a fixed point so that it can move freely under the action of gravity. That movement can be swinging movement or a vibrating movement. Types of pendulums that would work in the present invention include, but are not limited to, simple pendulums and physical pendulums. A simple pendulum is a mass suspended by a wire, thread, thin beam, or shaft, etc. from a fixed point, where the mass is free to swing in any direction under the influence of gravity. A physical pendulum is a rigid body mounted on a fixed horizontal axis, about which it is free to rotate under the influence of gravity.

Figure 3:
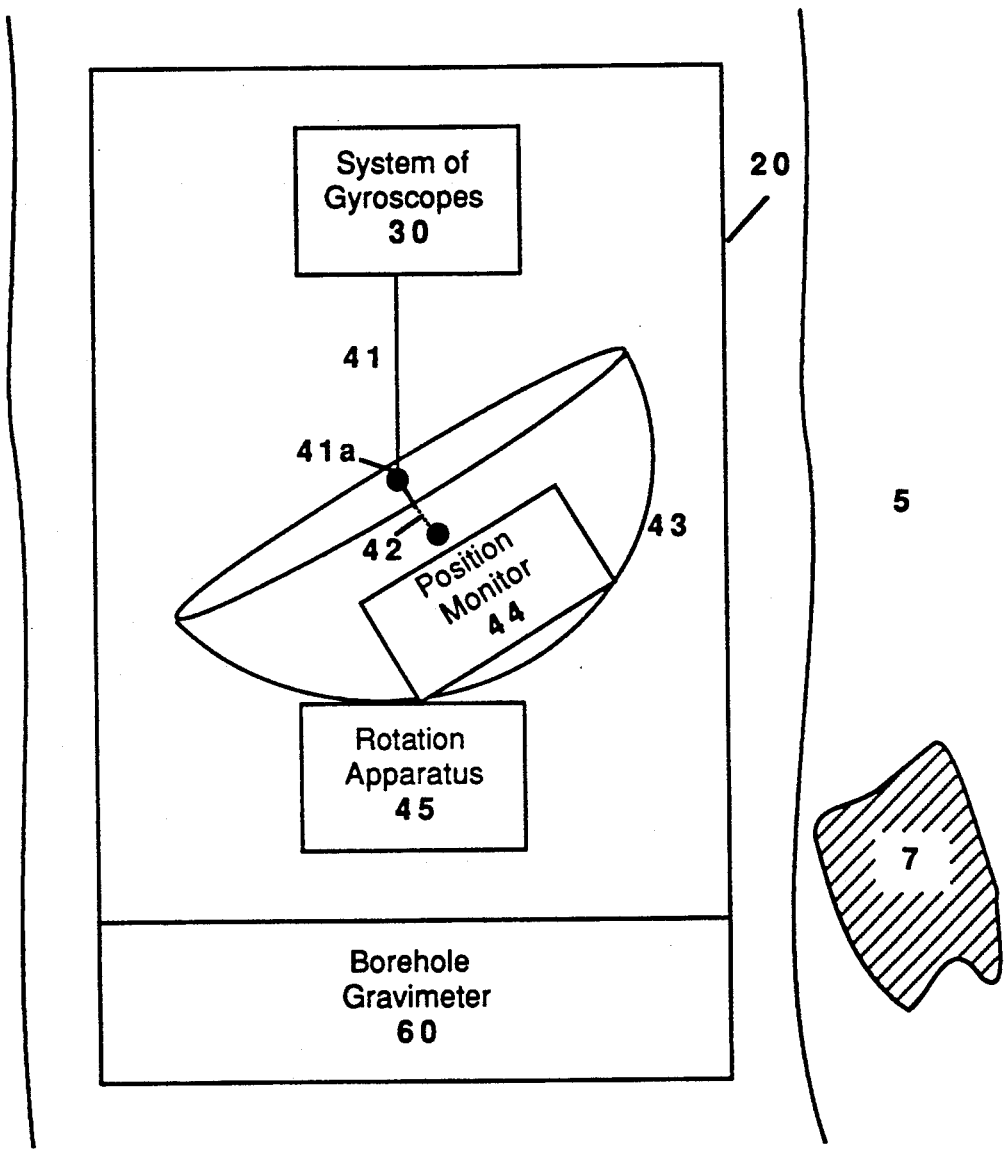
FIG. 3 illustrates an apparatus used to measure deflection of the vertical in a wellbore.

A generalized apparatus for this embodiment is shown in FIG. 3. A gyroscope 30 is used to maintain a suspension rod 41 in a fixed orientation as the well logging sonde 20 is lowered into a wellbore within formation 5. A pendulum 42 is allowed to swing free from a fixed point 41a on the suspension rod. A gravity anomalous mass 7 adjacent the wellbore (as exemplified here by a positive gravity anomaly) displaces the rod toward it. Position monitoring equipment monitors the position of hemispherical shell 43. Rotation apparatus 45 rotates hemispherical shell 43 to maintain a fixed orientation of the shell relative to the pendulum 42 while maintaining the center of the hemispherical shell at fixed point 41a. Note that the hemispherical shell is not attached to the suspension rod, nor is it attached to the pendulum. The precise value of the deflection spatial angle can be determined from information recorded by position monitoring equipment 44 and, therefore, deflection of the vertical can be determined. Particularly when combined with information from a high precision borehole gravimeter 60 and when done at a variety of locations in the wellbore, it is possible to find both the position and magnitude of geologic anomalies surrounding a borehole.

To maintain the shell at a fixed position with respect to the pendulum, a system must be provided to detect the location of the shell with respect to the pendulum and drive the shell to the proper position.

It is important that the moving portions of the device be constructed out of nonmagnetic materials, such as fused-quartz and carbon, to avoid errors induced by stray currents and the like in the surroundings of the tool.

Rotation apparatus 45 could be a system of gears mated with teeth on the underside of the hemispherical shell, a system of resilient rubber wheels driving the underside of the shell, or the like. A gear system is illustrated in FIGS. 4a, b, and c.

Figure 4A:
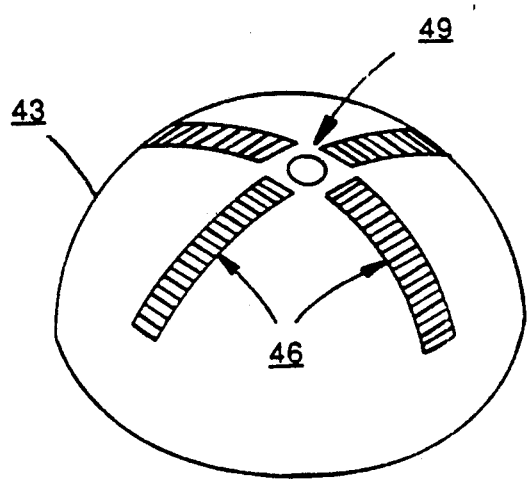
FIGS. 4 through 4c illustrate the drive mechanism for the hemispherical member of the apparatus.

FIG. 4a shows the hemispheric shell 43 view from below. Raised gear tracks 46 are mounted on the underside of the shell 43 at substantially right angle to each other. The hemispherical shell may contain an orifice 49 as described below.

Figure 4B:
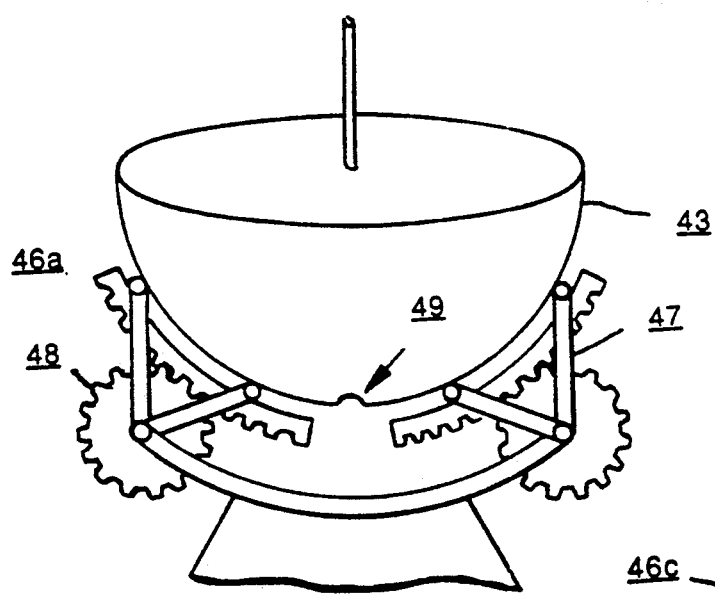

FIG. 4b shows the rotation apparatus in side view. A bracket 47 holds the shell 43. Gears 46a are engaged by cogged wheels 48, which can be driven by a motor or the like (not shown). Wheels 48 engage gears 46a to rotate the shell 43 to a desired position.

Figure 4C:
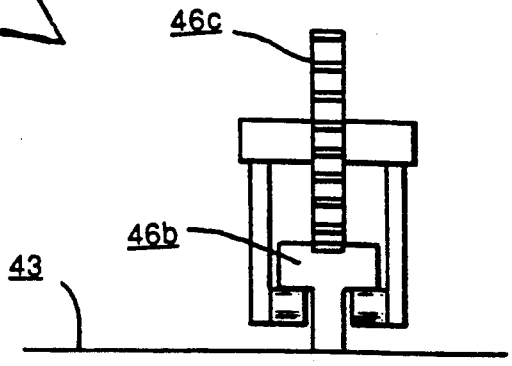

FIG. 4c shows a detailed cross-section of one possible gear arrangement. A raised T-bar 46b is mounted at right angles to shell 43. Cogged wheel 46c engages gears (not shown) on T-bar 46b to rotate the shell. The track and gear system act as a cradle that can move the hemisphere to any point while maintaining the center of the hemisphere at the fixed point.

EMBODIMENT INVOLVING A LIGHT SOURCE ATTACHED TO THE PENDULUM

In one embodiment involving a pendulum, the means for finding the deflection angle has a unidirectional light source attached to the pendulum and system of light sensors positioned to detect the direction of the light from the light source.

Types of light sources that would work in the present invention include, but are not limited to: incandescent bulbs recessed within thin tubes, laser light in optical fibers, or light-emitting diodes.

One type of light source is the light-emitting diode. A light-emitting diode is a semiconductor that emits lights when electrical voltage is applied to it. It has the advantage of uniformity. It is a common element of many electronic devices. It can be obtained in a variety of configurations. It can be small, and it can emit intense light.

When used in the present embodiment, the light source should be unidirectional. By "unidirectional," we mean that nearly all the light travels in a single direction. Preferably, the light source should be monochromatic. The light source probably will fail to be completely unidirectional due to light that diffracts elsewhere. One means of getting a unidirectional light is by putting the light source in a recessed tube.

By "light sensor," we mean a device for sensing the presence of light and measuring the amount of light that it receives. Types of light sensors that would work in the present invention include, but are not limited to, light-sensing diodes and solar devices. Light-sensing diodes are semiconductors that create an electrical voltage when light is applied to them. They have the advantages of uniformity and small size in much the same way as for light-emitting diodes. These "off-the-shelf" sensors are well-fabricated because they are used extensively.

The system of light sensors can be located on the inner portion of a shell that is, at least partly, either spherical or cylindrical. In other words at least part of the inner portion of the shell has a shape that is either spherical or cylindrical.

Figure 5:
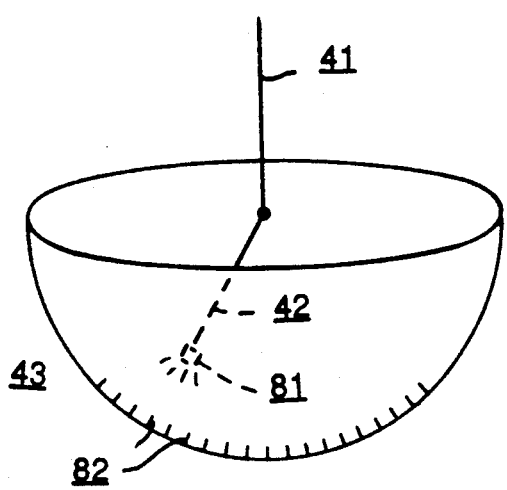
FIG. 5 illustrates an embodiment of the invention involving the use of a light source attached to a pendulum.

In one specific embodiment, shown in FIG. 5, the hemispheric shell 43 could be designed to be fixed with respect to the suspension rod 41. A light source 81 is suspended from the pendulum 42. The light source would preferably be an optical fiber. The inside surface of the hemisphere shell has many light sensitive diodes 82 that cover the entire inside surface of the shell. Preferably each of sensors can respond to several levels of intensity. Real time computer analysis of light intensity at the various diodes would yield the position of the pendulum.

One determination of direction is established when the recessed diode is illuminated at least once. A set of directions derived from various cup settings are weighted according to the individual fractions of established observation periods where no lights received.

In another specific embodiment, the system of light sensors is concentrated at the bottom of the shell, and the system has, within its center, a target light sensor. The means for finding the deflection spatial angle has a means to move the system of light sensors to maintain a constant orientation with respect to the pendulum and a means for monitoring the orientation of the system of light sensors. The target light sensor can be located in a recessed tube. The means to move the system of light sensors has a microprocessor that can identify which light sensor receives the maximum amount of light, calculate a direction to the target light sensor from the light sensor receiving the most light, and move the system of light sensors in the direction in search of the condition where the light received by the target light sensor is most. The axis of the shell is aligned with the pendulum when light is received at the target light sensor.

Figure 6:
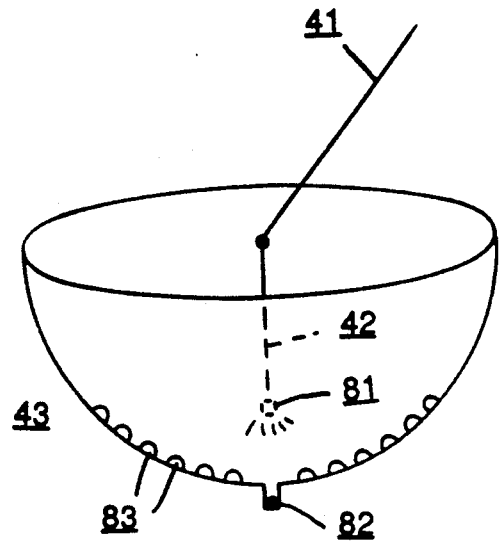
FIG. 6 illustrates another embodiment of the invention involving the use of a light source attached to a pendulum.

This alternate embodiment is shown in FIG. 6. In this embodiment an optical fiber or the like (depicted by 81) is used to transmit light from the pendulum 42. The pendulum must be constructed of sufficiently stiff material to prevent the fiber from bending. A single diode 82 is in a recessed area. Additional diodes 83 are located inside the hemispheric shell and are used to direct the tract mechanism toward the condition where the diode contained within a recessed area is illuminated. The light source is preferably a laser light source operably connected to the optical fiber.

The time that a given diode is illuminated is recorded. An analysis (using Fisher's statistical techniques) using a downhole microprocessor is done using the weighted (by illumination time) responses of all the diodes. A mean direction and an uncertainty are computed.

EMBODIMENTS INVOLVING FRESNEL DIFFRACTION PATTERNS

In one special embodiment, the means for finding the deflection spatial angle has a laser light source attached to the pendulum; and a means for creating a Fresnel diffraction pattern on a surface; a means of finding the diffraction pattern on the surface; means to move the surface, based upon the diffraction pattern, to maintain a constant orientation with respect to the pendulum; and means for monitoring the orientation of the surface.

One reference the provides background material for this concept is M. KLEIN and T. FURTAK, OPTICS (second edition), John Wiley and Sons, New York, N.Y., 1986, 660 pages (see Chapter 7). Another more general reference is F. SEARS, M. ZEMANSKY, and H. YOUNG, UNIVERSITY PHYSICS, Addison-Wesley Publishing Company, Reading, Mass., 1982, 929 pages (see Chapter 41).

By "diffraction," we mean any redistribution in space of the intensity of waves that results from the presence of an object causing variations of either the amplitude or phase of the waves. Diffraction occurs with all types of wave phenomena. Diffraction can be considered as a class of phenomena in which the ray model (propagation along straight lines) of geometric optics is not adequate to explain observed phenomena.

By "Fresnel diffraction," we mean a type of diffraction observed in the field of optics in which the source of light or the observing screen is at a finite distance from the aperture or obstacle.

By "Fresnel fringe," we mean a series of light and dark bands that appear near the edge of a shadow in Fresnel diffraction.

A convenient way to think about diffraction is to think of it as the bending of light (or other wave phenomena) around an obstacle. Diffraction sometimes appears contrary to common sense. Under certain conditions when light is projected on a screen, but is partially blocked by an opaque obstacle, there is some light in areas that common sense might suggest should be dark (within the geometric shadow).

Our consideration will involve only Fresnel diffraction phenomena associated with circular apertures and circular obstacles. These diffraction effects are observed when a part of a "wave" is "cut-off" by an obstacle. When monochromatic light is incident on an otherwise opaque surface having a small circular aperture, only a small circular patch of the light wave is transmitted and the remainder is "cut-off." The effect is that the light transmitted through the small aperture onto a screen forms a Fresnel diffraction pattern, which is larger in diameter than the small aperture and is comprised of alternating light and dark rings. These rings are due to the reinforcement (light rings) and cancellation (dark rings) of diffracted light.

In one embodiment, a pendulum has a source of unidirectional monochromatic light that is incident upon the inside of a moveable cup. The cup is at least in part spherical and the inside surface is partially covered with light-sensitive diodes that surround a small circular aperture. That aperture is at the point of the cup that is coincident with the axis of the cup. A small screen is attached to the cup in such a manner that light that is exactly incident upon the aperture falls on the screen. The screen is held perpendicular to the axis of the cup and moves when the cup moves. The screen includes an array of very small diodes that surround the point on the screen that intersects the extended axis of the cup; i.e., the axis of the cup can be considered to pass through the small aperture and extend downward onto a point on the screen beneath the cup.

If the light from the pendulum is directly incident upon the aperture, Fresnel diffraction patterns are generated that are comprised of rings of dark and light fringes symmetric about the extended axis of the cup. These fringes extend, on the surface of the screen, beyond the point of intersection of the extended axis of the cup and the screen, and are thus detectable as illumination on the diodes. If a symmetric pattern of fringes is detected, then that pattern is a Fresnel diffraction. This means that the monochromatic light from the pendulum has directly illuminated the small aperture in the cup.

The elapsed time when symmetric fringes are present is a measure of the persistence of the light on the aperture. This elapsed time can be used too as a weight in the determination of the representative cup position.

A second embodiment is similar to the first, except that the aperture in the cup is larger, the aperture includes a small spherical obstacle, the resulting Fresnel diffraction pattern is different, and only one diode is required on the screen located below the cup.

The Fresnel diffraction from a small circular obstacle is comprised of a circular shadow with a small bright spot of light at the center of the shadow. This spot of light is produced by constructive interference of the wavelets from the unobstructed portion of the incident wave.

A single diode, capable of measuring intensity of light, is place on the screen where the extended axis of the cup intersects the screen. The small circular obstacle is located along the axis of the cup. If a bright spot of light with an intensity greater than the intensity of the monochromatic light source associated with the pendulum is detected, then there is a Fresnel diffraction. This means that the monochromatic light from the pendulum has directly illuminated the small obstacle within the aperture in the cup.

The elapsed time when bright spot is present is a measure of the persistence of the light incident on the aperture. The elapsed time can be used to as a weight in the determination of the representative cup position.

The diodes on the surface of the cup are used to sense that the axis of the pendulum is not directed toward the small aperture (or the small obstacle within the aperture in the case of the second embodiment). The microprocessor generates appropriate commands that, in an iterative manner, cause the cup to be moved such that the pendulum is eventually aligned with the axis of the cup. When there is alignment of the axis of the cup and the pendulum, the aperture is illuminated (or, in the second embodiment, the obstacle is illuminated) and the appropriate Fresnel diffraction phenomena occurs. The condition of Fresnel diffraction is sensed by diodes (a single diode in the second embodiment) on a screen below the cup. The elapsed times for the presence of Fresnel diffraction are recorded with respect to the appropriate cup positions.

In this embodiment, involving a movable cup and pendulum having a fiber-optic light source, a closely spaced receiver diode array is concentrated at the bottom of the shell, and the axis of the shell is aligned with the pendulum when light is received at the single diode within the recessed tube. Alignment is refined by examining the nature of the Fresnel diffraction pattern that forms on a plate due to light that has passed through the aperture of the recessed narrow tube.

One determination of direction is established when the recessed diode is illuminated at least once. A set of directions derived from various cup settings are weighted according to the individual fractions of established observation periods where no light is received. Note that the light that passes through the recessed tube is diffracted (no diode at base of tube). The "fringes" from this phenomena are sensed in the same way as for the illuminated diode. The time duration where fringes are present is the basis for the weighting factor for a given direction.

Embodiment Involving a Reflective Means Attached to The Pendulum

The above described designs would be considered "active" in the sense that the hemisphere is rotated into alignment with the pendulum. It also would be possible to use a passive design.

Figure 7A:
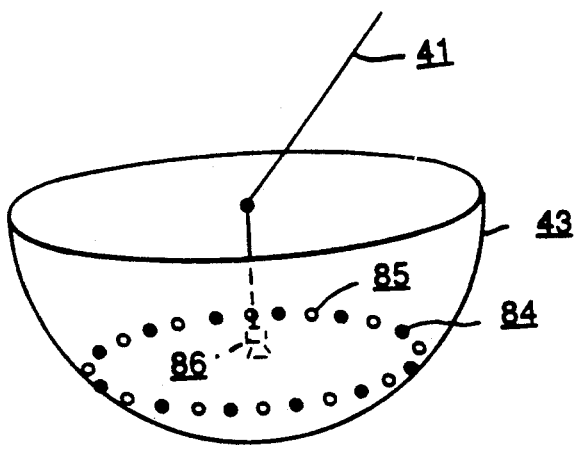
FIGS. 7a and 7b illustrate an embodiment of the invention involving the use of a reflective means attached to a pendulum.
Figure 7B:
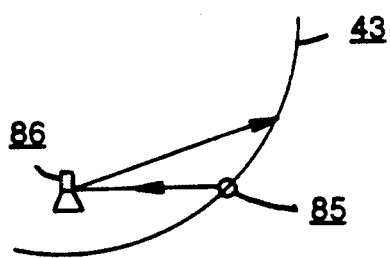

One possible system is shown in FIGS. 7a and 7b. As shown in FIG. 7a, a plurality of light sensitive diodes 84 and monochromatic light sources 85 are located in the inside walls of the hemispherical shell 43 in a generally ring-like fashion. The end of the pendulum 86 is designed to reflect light slightly out of the plane of the diodes, as shown in FIG. 7b. After placing the device in a desired location in the wellbore, the hemisphere is rotated until light is not received at any diode. At this point, the hemisphere is in alignment with the pendulum and the value of the deflection spatial angle can be determined. The light is preferably monochromatic light.

The means for finding the deflection spatial angel has a system of light sources and light sensors contained within a single plane, a reflective means attached to the pendulum that reflects light in a non-perpendicular manner, a means to move the system of light sources and light sensors so as to maintain a constant orientation with respect to the pendulum, and a means for monitoring the orientation of the system of light sources and light sensors.

When the axis perpendicular to the plane of light sources and light sensors is not aligned with the pendulum:

1. Most of the light sensors receive light.
2. Those sensors that do not receive light are symmetric about a line in the plane of sources and sensors.
3. The system must rotate about an axis perpendicular to this line in order for the system to become aligned with the pendulum.

The terms "light sources" and "light sensors", as used with this embodiment, are identical with the terms as used with the previous embodiment. As in the previous embodiment, the light sources should be unidirectional. As in the previous embodiment, the system of light sensors can be a system of light-sensitive diodes. In this embodiment, the system of light sources and light sensors can be located on the inner portion of a shell that is at least partly spherical.

Unique to this embodiment, the means to move the system of light sources and light sensors has a microprocessor that can identify which light sensors do not receive light, calculate a line that best fits the light sensors not receiving lights, and move the system of light sources and light sensors along the line in search of the condition where none of the light sensors receive lights.

The fraction of elapsed observation time where no light is received (compared with total elapsed time) is used as a measure of the reliability of a particular direction. A set of directions derived from various cup settings are weighted according to the individual fractions of established observation periods where no light is received.

Pattern of Illumination of Diodes

When the pendulum is not aligned with the axis of the cup, some light-sensitive diodes are illuminated and some are not illuminated. Each illuminated light-sensitive diodes receives light only from the particular light source located on the opposite side of the cup. The light paths between these pairs of light sources and light-sensitive diodes intersect the axis of the cup.

There are definite patterns of illuminated and non-illuminated light-sensitive diodes that occur when the pendulum is not aligned with the axis of the cup. It is possible to find the manner in which the cup must be moved to bring the axis of the cup into a position that is closer to being in alignment with the pendulum. The basic idea here is to move the cup into alignment with the pendulum in a series of steps where each step brings the axis of the cup closer to alignment than the previous step.

This idealized progression toward alignment may not always be possible due to the presence of noise (vibration). Under noisy conditions, some steps may actually move the cup to a position where the alignment is poorer than the previous step. When noise is a problem, more time is needed to achieve alignment.

The kinds of patterns (of illuminated and non-illuminated light-sensitive diodes) that arise when the pendulum is not aligned with the axis of the cup are simple, unambiguous, and easy to interpret. This simplicity and lack of ambiguity permit the use of a very simple microprocessor control system.

By "plane-of-alignment", we mean a vertical plane that contains the pendulum and the axis of the cup. When the pendulum and the axis of the cup are coincident, the vertical plane-of-alignment can have any orientation within the horizontal plane (envision a full 360-degree rotation of the plane about the vertical line that contained both the pendulum and the axis of the cup). When the pendulum and the axis of the cup are not coincident, a particular plane-of-alignment with a unique orientation within the horizontal plane is defined. The cup movement required to bring the axis of the cup into alignment with the pendulum is comprised of a rotation where the axis of rotation is perpendicular to the plane-of-alignment.

A close approximation to the position plane-of-alignment can be determined by observing the pattern of illuminated and non-illuminated light-sensitive diodes. The non-illuminated diodes can be considered to fall into two groups. Suppose that the axes of the cup and the pendulum are not in alignment. One group of non-illuminated diodes is distributed on the side of the cup nearest the pendulum and is distributed about the plane-of-alignment. The second group is on the opposite side of the cup and is also distributed about the plane-of-alignment.

The approximate orientation of the plane-of-alignment is found by determining that vertical plane that best divides each group of non-illuminated diodes into two parts; one part is on one side of the estimated plane-of-alignment and the other part is on the other side. A diode with a location that is coincident with the estimated plane can be considered to be half in one group and half in the other. When any group is comprised of an odd number of diodes, the estimated vertical plane-of-alignment will pass through the diode in the center of the group. When there is an even number, the plane will pass between the two central diodes.

The approximate plane-of-alignment will include or nearly include the pendulum and the axis of the cup. The side of the cup that is cut by the approximate plane-of-alignment and is closest to the pendulum is designated as the "low-side". The opposite side of the cup is designated as the "high-side". It is straightforward to identify the low-side by observing the pattern of non-illuminated diodes. The low-side is the side that corresponds to the side of the cup that is associated with that group of non-illuminated diodes that has the most diodes. Conversely the high-side is associated with that group that has the least non-illuminated diodes.

The required cup rotation aimed at bringing the axis of the cup into closer alignment with the pendulum is easily defined. The axis of the required rotation is horizontal and is perpendicular to the plane-of-alignment. The sense of rotation is that raises the low-side and lowers the high-side. The amount of rotation is that required to block the light between the particular pair of light-sensitive diode and light-source whose light path is closest to being perpendicular to the estimated plane-of-alignment.

Action of Microprocessor

The following steps associated with the action of the microprocessor are aimed at rotating the cup to gain a closer alignment between the axis of the cup and the pendulum:

Step 1. Sense that at least two-sensitive diodes are illuminated.

Step 2. Identify the two groups of diodes.

Step 3. Estimate the orientation of the vertical "plane-of-alignment".

Step 4. Identify the "low-side" and the "high-side".

Step 5. Identify the particular pair of light-sensitive diode and light-source where the light path between them is most nearly perpendicular to the estimated plane-of-alignment.

Step 6. Determine the direction of rotation of the cup required to bring the axis of the cup more nearly into alignment with the pendulum.

Step 7. Generate the commands to rotate the cup.

Step 8. Stop the rotation when the pendulum blocks the light path of the particular pair (diode/source) identified in Step 5.

Step 9. Measure and store the elapsed time for any time periods where all light-sensitive diodes are non-illuminated at the recorded cup position gained in Step 8.

Step 10. If two more light-sensitive diodes become illuminated for a predetermined time interval (depends upon prevailing noise level in local area where measurements are made), start again with Step 1.

Steps 1 through 10 are repeated until a satisfactory determination of the deflection spatial angle is gained.

Time On Target

Steps 1 through 10 will be followed repeatedly at a given stationary location on land, or in a mine shaft or tunnel, or in the borehole within a specified measurement period at that location. The acquired data comprise an array of cup positions and a corresponding array of elapsed times. There is a one-to-one correspondence between a given entry in one array with a specific entry in the other array. These data are used to find a representative cup position, which in turn is translated into a determination of the deflection spatial angle.

The representative cup position is a weighted average of the entries in the array of cup positions. Those cup positions associated with a relatively long elapsed time have more influence on the determination on the representative cup position than cup positions with shorter elapsed times. The weighting is straightforward. The weight for a given cup position is determined by dividing the elapsed time for that cup position by the total elapsed times for all cup positions. Note that the sum of all weights is unity. Each cup position is multiplied by its weight and the representative cup position is the average of the weighted cup positions.

While the above embodiments describe a hemispherical surface for finding pendulum orientation, one also could use a planar surface on which to locate the diodes. Simple trigonometric calculations would then yield the second spatial angle.

Embodiment Involving an Opaque Fluid

An entirely different embodiment of the means for finding the deflection spatial angle does not use a pendulum. Instead it uses an opaque fluid, a light source, and a system of light sensors.

The spatial angle is specified using estimates of two plane angles in a Cartesian coordinate system where one coordinate axis is parallel to the reference direction. Relative local vertical is sensed in terms of the horizontal fluid level in a liquid-tight spheric shell. The reference direction can be considered as being always parallel to a fixed coordinate axis of the sphere. As this physical sphere is translated and rotated, a downward normal to the fluid level is compared at some instant with the reference direction.

Because of measurement noise, the parameters that specify the horizontal plane of the fluid surface are estimated thousands of times and are averaged using special statistical techniques to gain a single estimate of the spatial angle.

This section describes the special statistical techniques used as they are used to gain a single estimate of the spatial angle in the presence of noise for a special case. This case involves a spherical shell almost completely covered with diodes where individual diodes are line up along meridian lines. The spherical shell is nearly half filled with an opaque fluid. A source of omni-directional light is at the center of the spherical shell.

The special statistical techniques used to gain a single estimate of the spatial angle in the presence of noise is adapted from the field of paleomagnetism. References useful for understanding the principles basic to this concept are: A. Cox and R. Doell, *Review of paleomagnetism*, 71 BULLETIN OF THE GEOLOGICAL SOCIETY OF AMERICA 645-768 (1960); R. Fisher, *Dispersion on a sphere*, 217 ROYAL ASTRONOMICAL SOCIETY OF LONDON PROCEEDINGS 295-305 (1953); E. Irving, PALEOMAGNETISM AND ITS APPLICATION TO GEOLOGICAL AND GEOPHYSICAL PROBLEMS, John Wiley and Sons, New York, 1964, 399 pages; T. NAGATA, ROCK MAGNETISM, Maruzen Company Limited, Tokyo, Japan, 1961, 225 pages; G. Watson, *Analysis of dispersion on a sphere*, 7 ROYAL ASTRONOMICAL SOCIETY MONTHLY NOTICES, GEOPHYSICAL SUPPLEMENT 289-300 (1956); G. Watson, *A test for randomness*, 7 ROYAL ASTRONOMICAL SOCIETY MONTHLY NOTICES, GEOPHYSICAL SUPPLEMENT, NO. 6, pages 160-161 (1956); G. Watson &

E. Irving, *Statistical methods in rock magnetism,* 7 ROYAL ASTRONOMICAL SOCIETY MONTHLY NOTICES, GEOPHYSICAL SUPPLEMENT 289-300 (1957).

By "direction cosine," we mean the cosine of a direction angle in space. By "direction angles," we mean the three angles that a line in space makes with the positive x, y, and z axes in a Cartesian coordinate system. By "Cartesian coordinate positive x, y, and z axes in a Cartesian coordinate system. By "Cartesian coordinate system," we mean a coordinate system in at least three dimensions where each of three axes intersect the others at right angles at an origin enabling the location of any point in space to be identified and specified by the distances between the point and each of the three axes—a more general definition allows n mutually perpendicular axes where n is any integer

Distinction Between The Physical Sphere and the Abstract Sphere

To transfer the ideas of the statistical techniques to the physical measurements that are actually made, a concept is used that involves defining two spaces. One is the real physical space of the sensor and the other is an abstract space that serves as a framework for the mathematical relationships that transform a plurality of measured quantities into the desired estimates (spatial angle and the uncertainty in the estimate of spatial angle). The flow of computations involves both spheres. The measurements are made using the framework of the physical sphere and are transformed into desired estimates, which are reported within the framework of the abstract sphere.

The need for a distinction between the physical and abstract spheres arises because the fluid level in the embodiment of the deflection-of-the-vertical sensor (with a spherical geometric shape) is not symmetric with respect to all axes. The fluid level does not include the center of the spherical sensor (the physical sphere). The fluid level is a distance, d, from the center of the physical sphere at its nearest point. The angular relationships associated with the transformation of the representation of the plane into the determination of the deflection spatial angle are in part based upon a spherical coordinate system that is symmetric about the origin of the sphere (abstract sphere).

A Single Point On The Surface Of The Opaque Fluid

The basic measurement that is made is to define a particular point along an array of diodes. In spherical geometry, the array of diodes is along a meridian of the sphere (analogous to a meridian on the earth that connects the geographic north and south poles and where every point of the meridian has the same longitude). In cylindrical geometry, the array of diodes is along a column that is parallel to the axis of the cylinder.

This point to be defined is important because it divides the array into two groups. One group includes those diodes that are illuminated by the fixed omnidirectional light source and the second group is comprised of non-illuminated diodes. The lack of illumination associated with the second group is due to the light being blocked by the opaque fluid. The position of the point is further refined by careful consideration of the case when a diode is only partially illuminated. Note that the point to be defined is a point on the surface of the opaque fluid.

This partial illumination is detected by the measured intensity of the light that falls on the diode. A low light intensity implies partial illumination, which in turn implies that the point to be defined falls somewhere on the partially illuminated diode. The exact procedure for using the degree of partial illumination to locate the point is described later.

Three Points On The Surface Of The Opaque Fluid

Three of these basic measurements of points along individual arrays of diodes are made simultaneously. These three points on the surface of the opaque fluid find the plane that characterizes the surface of the opaque fluid. The three points are along arrays of diodes that are chosen to be nearly equally spaced around the spherical or cylindrical surface of the sensor.

Statistical Techniques

The adaptation of the basic ideas of R. A. Fisher to the problem of estimating the spatial angle from a plurality of measurements in the presence of noise has the following steps:

Step 1. Estimate the location of the three points on the plane. These are: $(x_1, y_1, z_1)$; $(x_2, y_2, z_2)$; $(x_3, Y_3, z_3)$ Step 2. Form a system of three simultaneous, homogeneous, linear equations. These are:

$$Ax_1 + By_1 + Cz_1 + D = 0$$

$$Ax_2 + By_2 + Cz_2 + D = 0$$

$$Ax_3 + By_3 + Cz_3 + D = 0$$

Each equation is comprised of four linearly dependent coefficients; thus at least one can be expressed as a linear combination of the other three coefficients.

Step 3. Compute the array of length segments along the coordinate axes. These are:

$$\Delta x_{12} = x_1 - x_2;\ \Delta y_{12} = y_1 - y_2;\ \Delta z_{12} = z_1 - z_2$$

$$\Delta x_{23} = x_2 - x_3;\ \Delta y_{23} = y_2 - y_3;\ \Delta z_{23} = z_2 - z_3$$

Step 4. Difference the first two equations.

$$A\Delta x_{12} + B\Delta y_{12} + C\Delta z_{12} = 0$$

Step 5. Difference the last two equations.

$$A\Delta x_{23} + B\Delta y_{23} + C\Delta z_{23} = 0$$

Step 6. Eliminate C from the two equations.

$$C = \frac{-A\Delta x_{12} - B\Delta y_{12}}{\Delta z_{12}} = \frac{-A\Delta x_{23} - B\Delta y_{23}}{\Delta z_{23}}$$

Step 7. Form the ratio A/B by manipulating the result of step 6.

$$\frac{A}{B} = \frac{-\Delta y_{12}\Delta z_{23} - \Delta y_{23} - \Delta z_{12}}{\Delta x_{12}\Delta z_{23} - \Delta x_{23} - \Delta z_{12}}$$

Observe that for the equation:

$$A\Delta x_{12} + B\Delta y_{12} + C\Delta z_{12} = 0.$$

The ratio A/B can be considered to be a constant element of a large family of solutions (where B is not zero). Observe that k in the expression below could be any non-zero constant and the solution would not change.

$$k\left(\frac{A}{B}\Delta x_{12} - \Delta y_{12} + \frac{C}{B}\Delta z_{12}\right) = 0$$

Thus one representative solution is:

$$A = -\Delta y_{12}\Delta z_{23} - \Delta y_{23}\Delta z_{12}$$

$$B = -\Delta x_{12}\Delta z_{23} - \Delta x_{23}\Delta z_{12}$$

Step 8. Solve for C.

$$C = \frac{-A\Delta x_{12} - B\Delta y_{12}}{\Delta z_{12}}$$

This expression for C can be written where A and B are replaced using the results of step 7, which leads to the expressions for A, B, and C below:

$$A = -\Delta y_{12}\Delta z_{23} + \Delta y_{23}\Delta z_{12}$$

$$B = -\Delta x_{12}\Delta z_{23} + \Delta x_{23}\Delta z_{12}$$

$$C = -\Delta x_{12}\Delta y_{23} + \Delta x_{23}\Delta y_{12}$$

Step 9 Solve for D using A, B and C from step 8.

$$D = -\Delta X_1 - By_1 - Cz_1 \quad \text{(from step 2)}$$

$$D = -(-\Delta y_{12}\Delta z_{23} = \Delta y_{23}\Delta z_{12})x_1$$

$$D = -(-\Delta y_{12}\Delta z_{23} = \Delta y_{23}\Delta z_{12})y_1$$

$$D = -)-\Delta x_{12}\Delta z_{23} = \Delta x_{23}\Delta z_{12})z_1$$

Step 10 Transform the general equation of the plane into the Hessian normal form i.e., $Ax + By + Cz + D = 0$. when $A/Q + B/Q + C/Q + D/Q = 0$; where $Q = (A^2 + B^3 + C^2)^{0.5}$ and Q can be either positive or negative. define the following: $p = D/Q, n_1 = A/Q, n_2 = B/Q, n_3 = C/Q$ Step 11 Write the vector equivalent of the Hessian normal form.
Let $\overline{w} = \overline{x}i + \overline{y}j + \overline{z}k$; where ovs/$\overline{x}$/ implies a vector and i implies a unit vector
Let $\overline{n} = n_1i + n_2j + n_3k$, where i, j, and k are unit vectors
The Hessian normal form in vector notation is:

$$\vec{n} \cdot \vec{x} = -p$$

where * implies a scalar or inner product

Note that n is perpendicular to the plane and is called the normal vector. The orientation of n is determined by the sign of Q.

Step 12 Use each of the original estimated of locations on the plane to estimate the known length $|p|$, where $| \quad |$ implies an absolute value.

$$n_1X_1 + n_2Y_1 + n_3Z_1 = -P_1$$

$$n_1X_2 + n_2Y_2 + n_3Z_2 = -p_2$$

$$n_1X_3 + n_2Y_3 + n_3Z_3 = -P_3$$

The allowable error ε is established by experience and might be adjusted in the field depending on the noise level Let $\Delta P_n = (P - |P_n|)$ where P is the positive length within the sensor between the omni-directional light source and the nearest point on the opaque fluid surface—this is a constant quantity given that the volume of opaque fluid remains constant If $\Delta P_n$ is greater than e for n = 1, 2, or 3; then the solution is expressed as the equation of the plane, which passes through the three points: $(x_1,y_1,z_1)$, $(x_2,y_2,z_2)$, and $(x_3,y_3,z_3)$; as $Ax + By + Cz = 0$ is not valid.

Thus the estimate of a known distance, which is built-in to the sensor, offers a means to judge the veracity of a particular solution of the plane. The noise might be too severe to gain an accurate estimate of the equation of the plane when measurements of the locations of the three points are made.

Step 13. Up to this point, one determination of the plane was done, with a basis for judging the veracity of that determination. Consider a plurality of these determinations, where each determination is made at the same location under nearly the same conditions. Each determination of the plane can be expressed as a normal direction (perpendicular to the plane). The mean direction and the uncertainty are determined by applying statistical analysis to these normal directions in the context of a spherical topology.

Modifications Required For A Second Special Case

There is one other sensor configuration that employs and opaque fluid. This is where the sensor is in the form of a cylindrical shell. That shell is covered by light-sensitive diodes, which are organized in columns. Each column is parallel with the axis of the cylinder.

A simplified version of the steps listed above will suffice for the special case (cylindrical geometry). Step 1 through step 9 are required. This starts with the three points on the plane and finds the equation of the plane that includes the three points by determining the constants A, B, C and D.

The terms "light sources" and "light sensors," as used with this embodiment, are identical with the terms as used with the previous embodiments. The system of light sensors can be located on the inner portion of a shell that is at least partly spherical or it can be located on the inner portion of a shell that is at least partly cylindrical.

Embodiment Involving Multiple Means For Determining a Direction Along An Actual Plumb Line The apparatus, in all embodiments, can have a second means for finding the deflection spatial angle, where the deflection spatial angle determined by the first means is used as a first approximation of the deflection spatial angle in the second means. Two embodiments of the apparatus can be used in combination within the same container, case, logging sonde, or other portable container.

Many combinations of pairs of embodiments are possible. Those embodiments that employ a fixed cup, spherical shell, or cylindrical shell are ideally suited as embodiments that could provide a first approximation to the deflection spatial angle. This is because these embodiments require no movement and can produce a rapid first approximation.

Those embodiments that require movement (rotation) of a cup and incorporate a source of light within the pendulum are ideally suited to provide rapid accurate measurements of the deflection spatial angle. This is because only very small movements would be required, once the moveable cup was located near its final position, and the potential resolution inherent in these embodiments is very high.

Once the deflection spatial angle is determined by employing one embodiment to derive a first approximation followed by a final determination using a second embodiment, the instrument spatial angle is determined in the manner specified herein.

METHOD FOR DETERMINING DEFLECTION OF THE VERTICAL

The deflection of the vertical can be determined by finding a reference spatial angle between the perpendicular to the reference spheroid and a reference direction; finding an instrument spatial angle between the reference direction and an instrument characterization direction; finding a deflection spatial angle between the instrument characterization direction and a direction along a plumb line; and summing the reference spatial angle, the instrument spatial angle, and the deflection spatial angle.

MEASUREMENT OF THE DEFLECTION OF THE VERTICAL LEADS TO A THREE-DIMENSIONAL GRAVITY DETERMINATION

If there were no anomalous masses in the subsurface and no terrain, then the vertical direction would be tangent to the computed plumb-line everywhere within and outside the earth (tidal variations ignored). In this case, the deflection of the vertical is zero. A conventional surface or subsurface gravity measurement is made by first "leveling" the gravity sensor. This leveling process employs the equivalent of a carpenter's level or plumb-bob. Vertical is thus either perpendicular to the level surface defined with the carpenter's level or parallel with the direction of the plumb-bob.

By "vertical," we mean the direction of maximum gravity. This vertical direction is not necessarily tangent to the computed plumb-line. If it is not tangent to the theoretical plumb-line (after appropriate corrections have been made), then two things are true:

1. There is anomalous mass near the measurement location that is associated with an appreciable horizontal component of gravity that has "deflected" the vertical.

2. The measured vertical component is not the true vertical component of the earth's gravitational field.

The anomalous mass has deflected the measured vertical away from the theoretical vertical. Gravity has been measured not along the theoretical vertical but along a line that is a "resultant" direction. This resultant direction can be considered to be nearly vertical.

In some sense, the deflection of the vertical measurement complements the "nearly" vertical conventional gravity measurement by accurately defining "nearly." The measured deflection of the vertical is compared with the normal deflection of the vertical (plumb-line estimate). The measured "nearly" vertical conventional gravity measurement is corrected to "true" vertical and compared with independent estimates of interval density and the estimated "free-air" gravity gradient. These comparisons yield the desired three-dimensional vectors.

The deflection-of-the-vertical measurements is a borehole can be used with conventional borehole gravity measurements and auxiliary data to generate vectors in three-dimensional space, which aid in delineating anomalous mass distributions beyond the borehole. For certain isolated compact distributions of anomalous mass, the vectors will "point" directly at the anomalous body.

The Role of Statistics in the Measurement Process

The sensors in these embodiments are designed to estimate the direction of a pendulum with respect to a reference azimuth on the logging sonde. That pendulum will be in a constant state of motion during the measurement process. The magnitude of this motion is small in terms of visual detection but is appreciable in terms of the expected variations of the deflection of the vertical. The sources of this motion (vibration) can be considered within categories that span a broad range in terms of scale and the frequency content of the vibrations. Examples of the sources of motion in terms of one set of somewhat overlapping categories are provided below:

| TYPE | EXAMPLE |
| --- | --- |
| planetary | earth rotation irregularities |
| meteorological | weather |
| tidal | earth-tide and ocean-related phenomena |
| solid earth | earth tremors |
| regional | tectonic movement |
| local culture | freeways, oil field operations, etc. |
| borehole | cable stretch, gas bubbles, etc. |

The approach that is followed to reduce the influence of noise (vibration) on the measured pendulum direction is two-fold. First, the measurement is made continuously for several minutes. Second, statistical techniques are used to derive an estimate of the likely pendulum direction in the absence of noise. The sustained measurement period provides an opportunity to gain many estimated pendulum directions. Consider a single diode in any of the sensor designs. For a nominal sampling rate of 1000 samples per second and a duration of three minutes, there are 180,000 samples associated with the response of the diode.

The statistical techniques are based upon the work reported in R. Fisher, *Dispersion on a Sphere*, A217 PROCEEDINGS OF THE ROYAL ASTRONOMICAL SOCIETY 295-305 (1953). Fisher has developed a theory of errors where the topological framework is the surface of a sphere. G. Watson, *Analysis of dispersion on a sphere*, 7/4 MONTHLY NOTICES OF THE ROYAL ASTRONOMICAL SOCIETY 153-159 (1956); and G. Watson, and E. Irving, *Statistical methods in rock magnetism*, 7/6 MONTHLY NOTICES THE ROYAL ASTRONOMICAL SOCIETY 289-300 (1957) are excellent references in this area.

The adaptation of these statistical techniques involves the lower half of a spherical shell that represents a cup, which is an integral part of each of the sensor designs. Two angles specify a given location inside the hemispherical cup. The statistical techniques are used in two different ways.

The first way is to determine the off-center location of the light beam incident on the cup by using a computed "mean direction" and "uncertainty." If the uncertainty does not exceed an appropriate value, then the "mean direction" is used to derive microprocessor commands to move the cup toward an alignment with the cup axis.

The second way, in which the Fisher statistics are used, is to find the pendulum direction directly. This is done by analysis of the pattern of received light at diodes on the surface of a fixed cup. A "mean direction" and an "uncertainty" are determined. The "mean direction" is relative to the axis of the cup.

The embodiment involving a reflective means attached to the pendulum is a special case and the Fisher statistics are not used. In this case, the noise level is evident from the degree to which the receiver diodes receive light. Received light is analyzed using a microprocessor and the cup is moved to the null position (no light) by commands generated from the analysis.

Corrections that are Required

Before measured values of the deflection of the vertical can be used to reveal undiscovered aspects of the geology, a set of very straightforward corrections must be applied. The various corrections can be considered in the following categories:
calibration corrections
earth-tide corrections
terrain corrections
latitude corrections
regional geologic corrections
local geologic corrections
borehole corrections instrument drift corrections The corrections that must be applied to deflection of the vertical measurements are similar to the corrections that are applied to gravity measurements. References useful for understanding the principles basic to this concept are: M. DOBRIN, INTRODUCTION TO GEOPHYSICAL PROSPECTING, McGraw-Hill Publishing Company, New York, N.Y., 1976, 630 pages; F. GRANT AND G. WEST, INTERPRETATION THEORY IN APPLIED GEOPHYSICS, McGraw-Hill Publishing Company, New York, N.Y., 1965, 583 pages; I. Longman, *Formulas for computing the tidal accelerations due to the moon and the sun,* 64 JOURNAL OF GEOPHYSICAL RESEARCH 12, pages 2351-2355 (1959); L. NETTLETON, GEOPHYSICAL PROSPECTING FOR OIL, McGraw-Hill Publishing Company, New York, N.Y., 1940, 444 pages; W. TORGE, GRAVIMETRY, Walter de Guyter and Company, New York, N.Y., 1989, 465 pages; P. VANICEK & E. KRAKIWSKY, GEODESY: THE CONCEPTS, Elsevier Science Publishing Company, Inc., New York, N.Y., 1986, 697 pages.

EarthTide Correction

The earth-tide causes periodic temporal changes in both the horizontal and the vertical components of gravity, which are predictable with very high accuracy. Longman (1959) describes a means to compute the horizontal and vertical components of gravitational attraction for any location on earth at any time. The ratio of the horizontal to the vertical component, along with the lateral direction of the horizontal component (also described in Longman, 1959), provides a direct correction that can be applied to measured values of deflection-of-the-vertical.

Calibration Correction

By calibration correction we mean using independent information to insure that the measurements that are made are accurate. The independent information is data that depicts the performance of the embodiment under known conditions. That information can be derived either in the laboratory or in the field. In a laboratory, compact high-density objects, such as lead spheres, can be introduced at the same elevation as the sensor but with varying distances between the sensor and the objects. Calibration is gained by comparing a theoretical value of the horizontal component of gravitational attraction with the value derived from measured deflections-of-the-vertical. A field technique is possible where there is a calibration range comprised of a series of locations where the deflection-of-the-vertical has been derived by independent means with sufficient accuracy.

Terrain Correction

Irregular terrain near a measured location can distort the measured values. This can be true for locations on land, within mine shafts or tunnels, or in a borehole. A remedy involves estimating the influence of the terrain using computational techniques. A mathematical representation (a model) of the terrain is constructed. The gravitational attraction (both the vertical and horizontal components) is computed at the locations. the deflection-of-the-vertical due to the terrain is determined (ratio of horizontal component to vertical component, along with the direction of the horizontal component), and the influence of the terrain is algebraically subtracted from the measured values. Dobrin (1976) and Torge (1989) are good references. Vanicek and Krakiwsky (1986) provide a sophisticated approach to the problem of terrain influence.

Lattitude Corrections

Both the horizontal and vertical components of gravity vary over the surface and within the earth because of variations in the latitude of the locations where the values of gravity are established. This variation is due to the irregular shape of the earth and the rotation of the earth. Different locations are situated differently with respect to the irregularities in the shape of the earth and are associated with different influences due to the centrifugal force that arises from the earth's rotation. Straightforward mathematical relationships are available in Dobrin (1976) and Vanicek and Krakiwsky (1986).

Regional Geologic Corrections

Large-scale irregular mass distributions (continental scale) such as the anomalous mass deficiency below the Rocky Mountains of the American West, or boundaries between crustal plates at continental margins can impose a regional deflection-of-the-vertical throughout an area. This will influence local measurements in the given area. Often these regional-scale influences can be ignored. The influences can be accounted for by employing techniques similar to those described above for the influence of terrain. The difference is that mathematical models of subsurface mass distributions are required instead of models of terrain.

Local Geologic Corrections Including Borehole Corrections

The influence of irregular mass distributions near the borehole can distort measured values of the deflection-of-the-vertical. These mass distributions can be characterized in terms of corresponding anomalous density distributions and the gravitational attraction (vertical and horizontal components along with the lateral direction of the horizontal component) can be computed. From these computed quantities, one can determine and remove the influence of the irregular mass distributions.

Instrument Drift Corrections

The most severe problem in accurately determining the deflection-of-the-vertical is instrument drift. Suppose that the deflection-of-the-vertical is measured continually over several days. The measured values will vary during the time period due to two phenomena. The first phenomenon is the variation due to tidal forces, which can be removed as a correction since this variation is periodic and predictable. The second phenomenon is the variation associated with instrument drift.

There are many causes of instrument drift. One cause is small imperfections in the manufacture or design of the instrument. Another cause is related to technical limitations. For example, suppose the measurements made by a given instrument are adversely influenced by temperature and the designer has gone to great lengths to reduce this temperature influence. There may be technical limitations that cannot be completely overcome and a degree of adverse temperature influence remains, as manifested by instrument drift. It is not necessary to understand the exact cause of instrument drift to remove the influence of instrument drift from the measured values of deflection-of-the-vertical.

Instrument drift is the sum of sources of drift associated with a measurement. Thus, it is the sum of the individual drift characteristics of each of the components of the device used to perform the measurement. In the case of the deflection-of-the-vertical measurement, a major source of instrument drift is associated with the drift of the gyroscopes.

Instrument drift can be corrected by a three-step process:

1. Characterize instrument drift by direct observation at discrete, short time periods distributed throughout the measurement period. (Changes in measurements over time made with a particular instrument, a particular embodiment, and a particular location are attributed to instrument drift.)

2. Characterize instrument drift at times that are interim to the discrete, short time periods of step 1 by means of interpolation. (This assumes that instrument drift is smoothly varying throughout the measurement period.)

3. Remove the effects of instrument drift as characterized by steps 1 and 2 from the measured values of deflection-of-the-vertical. (This assumes that the drift is adequately characterized by considering the observations and interpolations of steps 1 and 2.)

Envisioned Applications

The applications described below relate to deflection of the vertical measurements, which can be made on the surface of the earth, in mine shafts, and in boreholes for hydrocarbon or mineral exploration and development. The envisioned applications fall naturally into five categories. These are:

1. estimating geologic structure beyond the borehole,
2. detecting stratigraphic changes beyond the borehole,
3. aiding in monitoring changes in reservoir fluid density with time,
4. directly exploring for certain ore bodies, and
5. identifying situations where our perception of the subsurface is incorrect.

The detection of structure beyond the borehole is perhaps the most important. This application includes the detailed mapping of the flank of a salt diapir from a borehole either outside or within the salt distribution. A reef or other local structure that is "just missed" could be located (borehole gravity could define the vertical interval and the deflection of the vertical sensor could provide the lateral direction). The general distribution of sedimentary rocks below a thrust plate could be estimated in certain situations. A fault that brings rocks of different densities together could be detected at a distance from the borehole. The contribution of the deflection of the vertical determination would provide a lateral component of the diction between the sensor and the anomalous mass distribution.

Stratigraphic changes that occur beyond the borehole can be detected under certain conditions. For example, a shale unit that is encountered by the borehole may be comprised of a sandstone facies beyond the borehole.

Repeat measurements using a conventional borehole gravity sensor could be useful in finding the changes that occur in the fluid density within a particular vertical interval over a period of years. Such changes can be related to the normal change in oil saturation due to production or to the progress of a flood (carbon dioxide, water, steam, or fire). The role of the deflection of the vertical sensor is envisioned as providing lateral information. Suppose a changing oil saturation was detected over a period of years using conventional vertical component gravity measurements. Oil saturation is a quantitative measure of the fraction of the fluid component of a rock formation that is comprised of oil—expressed as a decimal fraction such as 0.7 or as a percentage such as 70%. If the corresponding deflection of the vertical measurements remained unchanged during this time, then the depletion of oil may have been uniform. A non-uniform depletion may cause the deflection of the vertical measurement to change over time. Consider a steam flood. The deflection of the vertical measurements would provide a means to find the lateral direction to the flood front.

A three-dimensional gravity measurement is ideally suited for detecting and developing an ore body that contrasts in density with the country rock. The measurements (vertical component gravity and the deflection of the vertical) could be made on the surface, in boreholes, or in mine shafts.

Our knowledge of the subsurface geology can be described mathematically in terms of a three-dimensional model of the density distribution. This model can be used to estimate accurately the gravity field at all points in space that would exist if the model represented the actual subsurface. When the field estimated from the model is not identical with that which is measured, then there is some aspect of subsurface geology that we do not understand. Awareness of this lack of understanding could become a lead for either exploration or more effective development.

In each of the above, the measurements of deflection of the vertical are considered to be made in concert with a conventional borehole gravity (i.e., the vertical component of gravity). Recall that the two measurements together provide a three-dimensional gravity determination. Certain of the applications described above could benefit from a combination of surface and subsurface measurements of both vertical component gravy and the deflection of the vertical.

The singular distinction between a measurement of the deflection of the vertical and a measurement of relative tilt is that the former is referred to an absolute standard. This is a significant difference. The deflection of the vertical measurement has the potential to contain information concerning the local geology that cannot be available with a relative tiltmeter measurement.

One possible sonde design includes the following devices:

1. accelerometer,
2. upper and lower casing-collar locators,
3. upper and lower natural gamma-ray sensors,
4. upper and lower natural gamma-ray heat sinks,
5. deflection of the vertical sensor and support electronics,
6. vertical component gravity sensor and support electronics,
7. temperature stabilized flask to house gravity sensor, and
8. heat conductor, thermo-electric unit, and insulated bulkhead, which comprise a system for maintaining a constant temperature environment for the gravity sensor.

While the present invention has been described with reference to specific embodiments, this application is intended to cover those various changes and substitutions that may be made by those skilled in the art without departing from the spirit and scope of the appended claims.

What is claimed is:

1. A non-magnetic apparatus comprising:
   (a) means for finding an instrument spatial angle between a reference direction and an instrument characterization direction, wherein the means for finding said instrument spatial angle comprises a gyroscope, and
   (b) means for finding a deflection spatial angle between said instrument characterization direction and a direction along a plumb line, wherein the means for finding a deflection spatial angle is attached to the means for finding an instrument spatial angle.

2. An apparatus according to claim 1 wherein said means for finding said deflection spatial angle comprises a pendulum.

3. An apparatus according to claim 2 wherein said means for finding said deflection spatial angle further comprises:
   (a) a unidirectional light source attached to said pendulum; and
   (b) a system of light sensors positioned to detect the direction of the light from said light source.

4. An apparatus according to claim 3 wherein:
   (a) said system of light sensors has, within its center, a target light sensor; and
   (b) said means for finding the deflection spatial angle further comprises:
      (1) means to move said system of light sensors so as to maintain a constant orientation with respect to said pendulum; and
      (2) means for monitoring the orientation of said system of light sensors.

5. An apparatus according to claim 2 wherein said means for finding said deflection spatial angle comprises:
   (a) a system of light sensors and unidirectional light sources contained within a single plane;
   (b) a reflective means attached to said pendulum that reflects light in a non-perpendicular manner;
   (c) a means to move said system of light sensors and light sources so as to maintain a constant orientation with respect to said pendulum; and
   (d) a means for monitoring the orientation of said system of light sensors and light sources.

6. An apparatus according to claim 5 wherein said light sensors comprise light-sensitive diodes.

7. An apparatus according to claim 5 wherein said system of light sensors and light sources is located on the inner portion of a shell that is at least partly spherical.

8. An apparatus according to claim 1 further comprising a second means for finding said deflection spatial angle, wherein the direction determined by said means for finding said deflection spatial angle of section (b) of claim 1 is used as a first approximation of the deflection spatial angle.

9. An apparatus according to claim 1 further comprising means for finding a reference spatial angle between the perpendicular to a reference spheroid and the reference direction.

10. A method for determination of the deflection of the vertical comprising:
   (a) finding a reference spatial angle between the perpendicular to a reference spheroid and a reference direction;
   (b) finding an instrument spatial angle between said reference direction and an instrument characterization direction;
   (c) finding a deflection spatial angle between said instrument characterization direction and a direction along a plumb line; and
   (d) adding together said reference spatial angle, said instrument spatial angle, and said deflection spatial angle.

* * * * *